(12) United States Patent
Glover et al.

(10) Patent No.: US 10,037,106 B2
(45) Date of Patent: Jul. 31, 2018

(54) OPTICAL SENSOR ARRANGEMENT AND METHOD FOR GESTURE DETECTION

(71) Applicant: ams AG, Unterpremstaetten (AT)

(72) Inventors: Kerry Glover, Rockwall, TX (US); David Mehrl, Plano, TX (US); Sean Donnelly, Plano, TX (US); James Lawrence Archibald, II, Highland Village, TX (US)

(73) Assignee: ams AG, Unterpremstaetten (AT)

( * ) Notice: Subject to any disclaimer, the term of this patent is extended or adjusted under 35 U.S.C. 154(b) by 22 days.

(21) Appl. No.: 15/026,950

(22) PCT Filed: Sep. 30, 2014

(86) PCT No.: PCT/EP2014/070967
§ 371 (c)(1),
(2) Date: Apr. 1, 2016

(87) PCT Pub. No.: WO2015/049245
PCT Pub. Date: Apr. 9, 2015

(65) Prior Publication Data
US 2016/0299635 A1    Oct. 13, 2016

Related U.S. Application Data

(60) Provisional application No. 61/886,952, filed on Oct. 4, 2013.

(30) Foreign Application Priority Data

Oct. 16, 2013  (EP) .................................. 13188924

(51) Int. Cl.
*G06F 3/041*    (2006.01)
*G06F 3/042*    (2006.01)
(Continued)

(52) U.S. Cl.
CPC ............ *G06F 3/0421* (2013.01); *G06F 3/017* (2013.01); *G06F 3/0304* (2013.01); *G06F 3/0416* (2013.01)

(58) Field of Classification Search
CPC ........ G06F 3/042; G06F 3/0421; G06F 3/017; G06F 3/0304
See application file for complete search history.

(56) References Cited

U.S. PATENT DOCUMENTS 9,383,434 B2 *  7/2016  Bouchilloux ........... G01S 17/46
9,489,051 B2 * 11/2016  Mankowski ............ G06F 3/017
(Continued)

FOREIGN PATENT DOCUMENTS

| DE | 10233233 A1 | 2/2004 |
| DE | 10242890 A1 | 3/2004 |
| WO | 2012/052069 A1 | 4/2012 |

OTHER PUBLICATIONS

Cheng H.-T.: "Contactless Gesture Recognition for Mobile Devices", MIAA 2011, Feb. 13, 2011, pp. 1-4,—received from the internet on Jul. 19, 2013 from <http://repository.cmu.edu/cgi/viewcontent.cgi?article=1018&context=silicon_valley>.

(Continued)

*Primary Examiner* — Lixi C Simpson
(74) *Attorney, Agent, or Firm* — McDermott Will & Emery LLP

(57) ABSTRACT

An optical sensor arrangement (10) comprises at least two light sensors (35, 36) for providing at least two sensor signals (S1, S2), and an evaluation circuit (12) that comprises an input (16) coupled to the at least two light sensors (35, 36) and is designed to evaluate the at least two sensor signals (S1, S2) for gesture detection in an adaptive manner using previous values of the at least two sensor signals (S1, S2).

13 Claims, 12 Drawing Sheets

(51) Int. Cl.
   *G06F 3/01* (2006.01)
   *G06F 3/03* (2006.01)

(56) References Cited

U.S. PATENT DOCUMENTS

| | | |
|---|---|---|
| 2008/0158174 A1 | 7/2008 | Land et al. |
| 2009/0139778 A1 | 6/2009 | Butler et al. |
| 2010/0332182 A1 | 12/2010 | Yatsuda et al. |
| 2011/0041100 A1 | 2/2011 | Boillot |
| 2011/0169743 A1* | 7/2011 | Oh .......................... H04M 1/22 345/169 |
| 2011/0310005 A1 | 12/2011 | Chen et al. |
| 2012/0280107 A1 | 11/2012 | Skurnik et al. |
| 2012/0280904 A1 | 11/2012 | Skurnik et al. |
| 2012/0312956 A1 | 12/2012 | Chang et al. |
| 2013/0162520 A1 | 6/2013 | Kettle |

OTHER PUBLICATIONS

Cheng H.-T.: "Contactless Gesture Recognition System Using Proximity Sensors", Consumer Electronics (ICCE), 2011 IEEE International Conference on Jan. 9-12, 2011, pp. 1-2,—received from the internet on Jul. 15, 2013 from <http://repository.cmu.edu/cgi/viewcontent.cgi?article=1017&context=silicon_valley>.

Datasheet "Monolithic Optical Proximity/Ambient Light Sensor" BH1771GLC from ROHM Co., Ltd.; published Sep. 2009; retrieved from the internet in Sep. 2013; <http://www.farnell.com/datasheets/1512066.pdf>.

Kim Y.S. et al.: "A motion gesture sensor using photodiodes with limited field-of-view"; Published Apr. 8, 2013, vol. 21, No. 8, pp. 1-9, DOI: 10.1364/OE21.009206, Optics Express 9206.

* cited by examiner

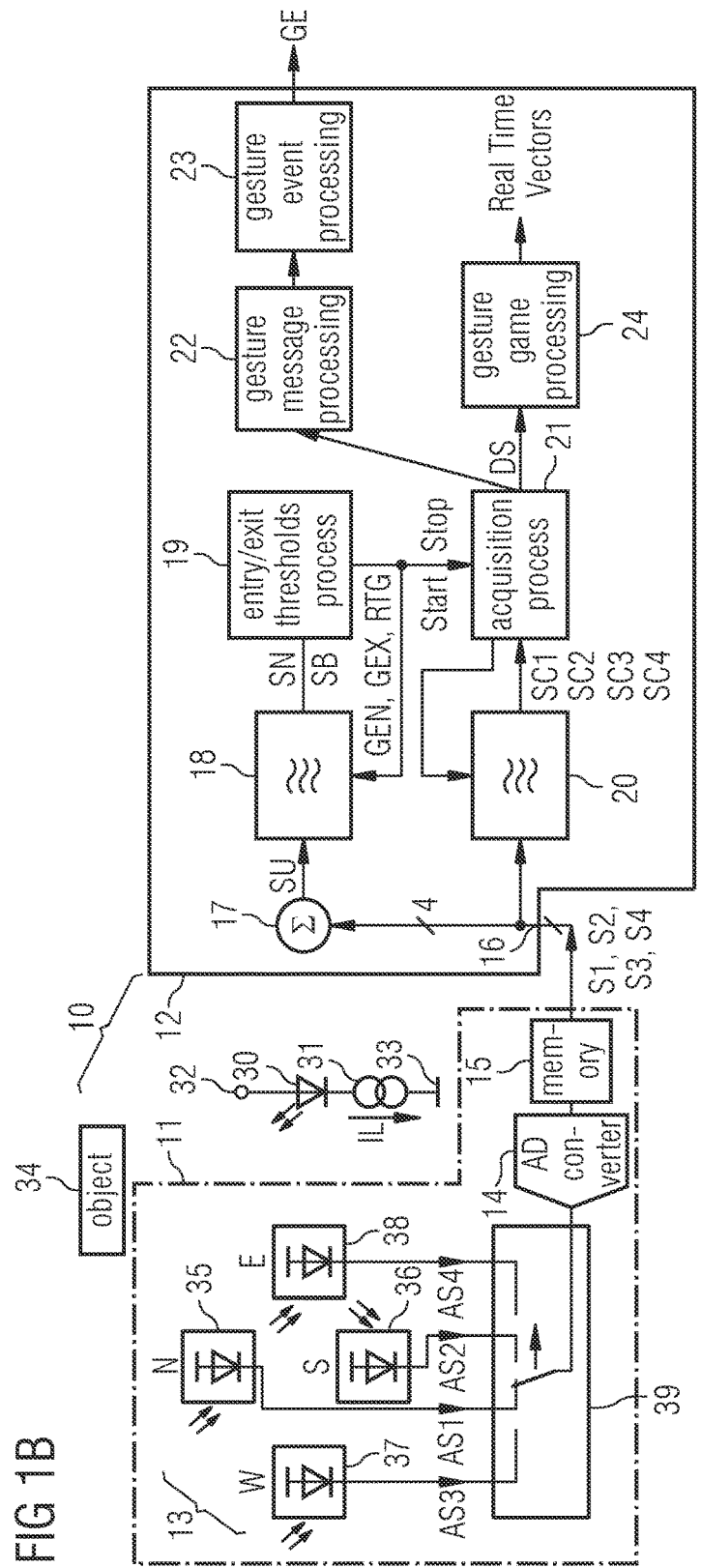

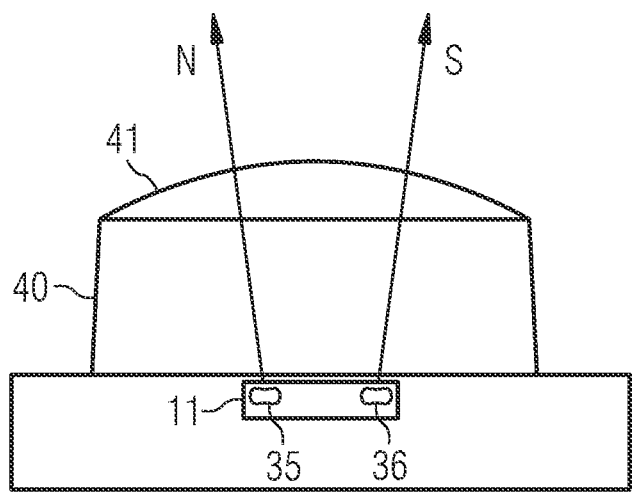
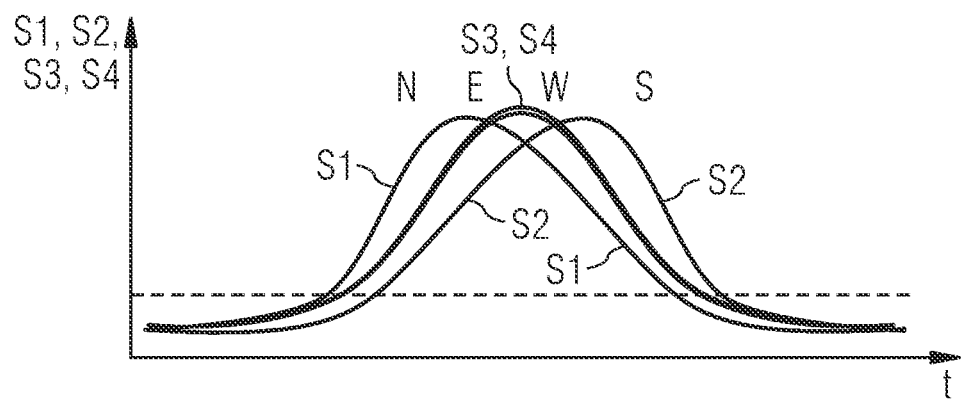

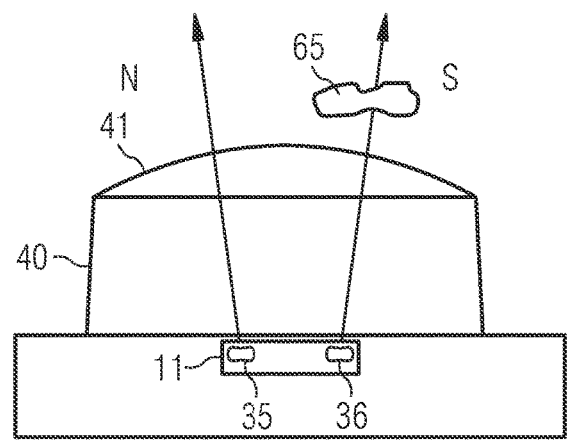
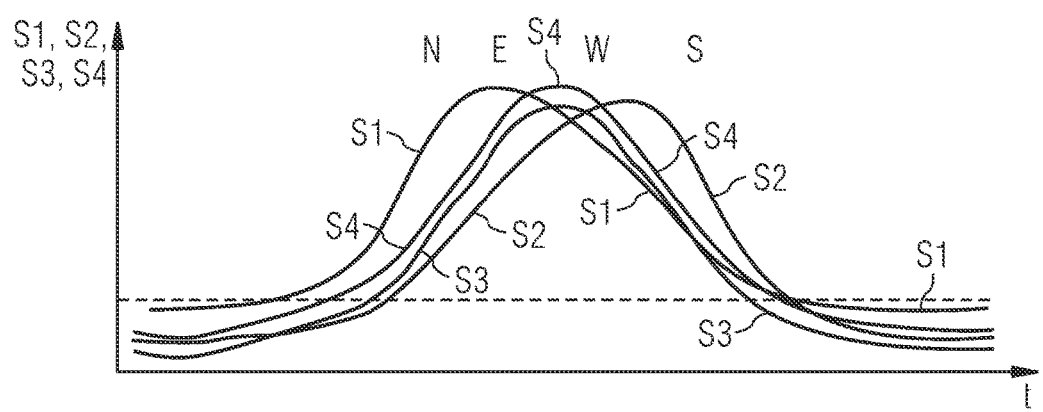

FIG 6J
| Cross | Diagonals | Tap | Button | Other |
|---|---|---|---|---|
| Cross_N_S | Cross_NE_SW | TAP_N | Button_N | Started |
| Cross_S_N | Cross_SW_NE | TAP_S | Button_S | Button_Held |
| Cross_E_W | Cross_NW_SE | TAP_E | Button_E | Button_Relased |
| Cross_W_E | Cross_SE_NW | TAP_W | Button_W | |
FIG 6K
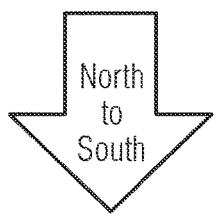 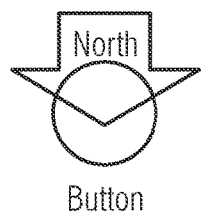 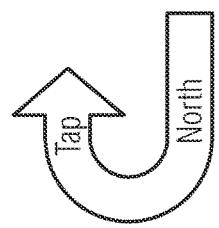 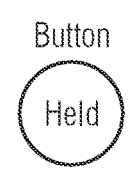

OPTICAL SENSOR ARRANGEMENT AND METHOD FOR GESTURE DETECTION

BACKGROUND OF THE INVENTION

The present invention is related to an optical sensor arrangement and a method for gesture detection.

Some gesture technologies require touching a screen or physically moving a mouse device. As an alternative touchless gesture mechanisms are developed. For example, cameras are being used to detect human gestures. However, these systems are expensive and complex and only work at long distances.

Document US 2012/0280904 A1 describes a method for detecting gestures using a multi-segment photodiode.

SUMMARY OF THE INVENTION

In an embodiment, an optical sensor arrangement comprises at least two light sensors for providing at least two sensor signals and an evaluation circuit that comprises an input coupled to the at least two light sensors. The evaluation circuit is designed to evaluate the at least two sensor signals for gesture detection in an adaptive manner using previous values of the at least two sensor signals.

Since the at least two sensor signals not only depend on a gesture but also to a changing surrounding, an adaptive evaluation on the basis of previous values of the at least two sensor signals improves the recognition of the gesture.

In an embodiment, the evaluation circuit is designed to start capturing the at least two sensor signals for gesture detection, if a signal derived from the at least two sensor signals is larger than a gesture entry threshold. Furthermore, the evaluation circuit is designed to dynamically adapt the gesture entry threshold depending on the previous values of the at least two sensor signals.

Advantageously, the gesture entry threshold is adapted dynamically as a function of the previous values of the at least two sensor signals. Thus, the influence of ambient light and other objects near the optical sensor arrangement is reduced. The at least two captured sensors signals are optionally interpreted for gesture detection.

In an embodiment, the evaluation circuit is designed to determine the gesture entry threshold by adding a distance signal to a baseline signal.

Thus, the gesture entry threshold can advantageously be determined by a flexible use of at least two parameters.

In an embodiment, the evaluation circuit is designed to determine a noise signal by noise filtering of a sum of the at least two sensor signals. The distance signal depends on the noise signal.

Advantageously, the gesture entry threshold is increased in case of noise in the previous values of the at least two sensor signals.

In a further development, the evaluation circuit is designed to determine the distance signal by multiplying a standard deviation factor with the noise signal.

In an embodiment, the evaluation circuit is designed to determine a slow filter signal by filtering the sum of the at least two sensor signals with a slow filter, a medium filter signal by filtering the sum of the at least two sensor signals with a medium filter, and the baseline signal by selecting the minimum of the slow filter signal and the medium filter signal.

In an embodiment, a cutoff frequency of the slow filter is lower than a cutoff frequency of the medium filter. The cutoff frequency may also be named corner frequency or break frequency. The slow and the medium filter are realized as low pass filters. The slow filter signal is limited to a smaller cutoff frequency than the medium filter signal.

In an embodiment, the evaluation circuit is designed to stop capturing the at least two sensor signals for gesture detection, if the signal derived from the at least two sensor signals is lower than a gesture exit threshold. The gesture exit threshold may be equal to the gesture entry threshold.

In a further development, the evaluation circuit is designed to determine the gesture exit threshold by generating a first multiplied distance signal by multiplying the distance signal with a first predetermined factor and adding the first multiplied distance signal and the gesture entry threshold.

In an embodiment, the optical sensor arrangement is designed to generate at least two filtered signals by filtering the at least two sensor signals and to generate at least two offset-compensated sensor signals by subtracting the filtered signals from the corresponding sensor signals.

Advantageously, each of the sensor signals receive an offset compensation. Contrary to previous methods wherein the offset is not reduced or is reduced only by a predetermined amount, the offset is now controlled in an adaptive manner. Without offset adaptation, the offset could be either very positive or negative. If negative, it would greatly reduce the maximum distance the optical sensor arrangement could sense. If positive, it would affect the dynamic range of the device.

In an embodiment, the evaluation circuit is designed to generate at least two scaled sensor signals by multiplying the at least two offset-compensated sensor signals with at least two scaling factors or by adding the at least two offset-compensated sensor signals and at least two scaling coefficients.

In an embodiment, the signal derived from the at least two sensor signals which are compared with the gesture entry threshold for starting capturing the at least two sensor signals is one of the scaled sensor signals or the sum of more than one of the scaled sensor signals.

In an embodiment, an optical sensor arrangement comprises at least two light sensors for providing at least two sensor signals, and an evaluation circuit. The evaluation circuit comprises an input coupled to the at least two light sensors. The evaluation circuit is designed to generate an entry vector indicating the position of an object relative to the at least two light sensors at the start of a gesture and an exit vector indicating the position of the object relative to the at least two light sensors at the end of the gesture.

By the determination of the entry vector and the exit vector, a gesture can be analyzed more thoroughly and therefore more information can be gained from a gesture. Whereas previous methods allow for only a single vector of a gesture detection, now entry and exit vectors advantageously determine a gesture. The use of entry and exit vectors combined with careful analysis allows more gestures to be decoded, thus increasing the gesture vocabulary of the optical sensor arrangement.

In an embodiment, the first coordinate of a vector is a north to south strength and the second coordinate of the vector is an east to west strength. This is valid for the entry and the exit vector. Thus, the first coordinate of the entry vector and of the exit vector is the north to south strength at the start and at the end of the gesture, respectively. The second coordinate of the entry vector and of the exit vector is the east to west strength at the start and at the end of the gesture, respectively.

In an embodiment, the values of the first coordinate of the entry vector and of the exit vector may be different or equal. Correspondingly, the values of the second coordinate of the entry vector and of the exit vector may be different or equal. By the optical sensor arrangement eight basic functions can be decoded such as the directions north to south, south to north, east to west, west to east, northeast to southwest, southwest to northeast, northwest to southeast and southeast to northwest. Using more complex decoding, eight additional functions can be decoded including north tap, south tap, east tap, west tap, north button push, south button push, east button push and west button push. Whereas south tap is a short gesture, south button push would is a long gesture. North, south, west and east are equivalents to top, bottom, left and right or y, −y, x and −x direction.

In an embodiment, the evaluation circuit is designed to recognize a tap gesture, if the entry vector and the exit vector are nearly the same and the duration of the gesture is less than a first predetermined duration.

In an embodiment, the evaluation circuit is designed to recognize a button gesture, if the entry vector and the exit vector are nearly the same and the duration of the gesture is larger than a second predetermined duration.

In an embodiment, a method for gesture detection comprises providing at least two sensor signals by at least two light sensors. Moreover, the at least two sensor signals are evaluated for gesture detection in an adaptive manner using previous values of the at least two sensor signals.

In a further development, a gesture entry threshold is dynamically adapted depending on the previous values of the at least two sensor signals. Furthermore, the at least two sensor signals are captured for gesture detection, if a signal derived from the at least two sensor signals is larger than the gesture entry threshold.

Whereas previous methods had a fixed threshold above which the sensor response would be considered valid, the threshold advantageously is now adaptive. Without threshold adaptation, the distance sensitivity would vary from device to device and gestures would only be detected at a much shorter distance.

The method is performed on-line. The method steps such as the adapting of the gesture entry threshold and the capturing of the at least two sensor signals as well as other method steps may be performed by an evaluation circuit on-line.

In an embodiment, the method for gesture detection comprises generating at least two filtered signals by filtering the at least two sensor signals. At least two offset-compensated sensor signals are generated by subtracting the filtered signals from the corresponding sensor signals.

In an embodiment, a method for gesture detection comprises providing at least two sensor signals by at least two light sensors, and generating an entry vector indicating the position of an object relative to the at least two light sensors at the start of a gesture and an exit vector indicating the position of the object relative to the at least two light sensors at the end of the gesture.

The optical sensor arrangement can be applied for touchless gesture sensing in a computer system or a device for mobile communication. As a result of advances in silicon technology costs can be substantially lowered. Alternatively, the optical sensor arrangement can be used in house thermostats and in the medical field. Doctors no longer need to touch anything in order to interact with a computer, thus eliminating potential contact with germs on surfaces.

In a further development, the evaluation circuit with the adaptive threshold and/or the offset control can also be designed to generate the entry vector and the exit vector indicating the position of the object relative to the at least two light sensors at the start and at the end of the gesture.

Thus, the previously described methods for gesture detection can be combined. The evaluation circuit can be designed to implement a single one or two or more of the methods.

In an embodiment, capturing the at least two sensor signals starts at the start of the gesture. Thus, the entry vector may be determined, when the signal derived from the at least two sensor signals is larger than the gesture entry threshold.

Correspondingly, capturing the at least two sensor signals may end at the end of the gesture. Thus, the exit vector may be determined, when the signal derived from the at least two sensor signals is lower than the gesture exit threshold.

Optionally, the optical sensor arrangement relates to light sensors, and more specifically to proximity and gesture sensing. The optical sensor arrangement may provide dynamic threshold calibration to allow for proximity and gesture sensing at the longest possible distance. The optical sensor arrangement may combine methods and algorithm for adaptive threshold, offset control and the use of entry and exit vectors in gesture sensing.

In an embodiment, the optical sensor arrangement obtains two or more directional components.

The at least two light sensors may be sensitive in different directions.

In an embodiment, the optical sensor arrangement comprises a light source. The at least two light sensors and the light source are packaged in the same subsystem. The at least two light sensors detect reflected light which is emitted by the light source. The reflected light may be infrared light. The light sensors may be implemented as passive infrared sensors, abbreviated PIR sensors. Thus, the light sensors can also be realized as heat sensors.

In an embodiment, the optical sensor arrangement is sensitive in two directional components. Thus, the optical sensor arrangement comprises exactly two light sensors.

In an alternative embodiment, the optical sensor arrangement is sensitive in four directional components. Thus, the optical sensor arrangement comprises exactly four light sensors.

In an alternative embodiment, the optical sensor arrangement is free of an electric light source. Instead, the optical sensor arrangement uses ambient light as light source.

In an embodiment, the optical sensor arrangement is configured for gesture detection. The at least two sensor signals are evaluated for gesture detection. Gesture detection can also be named gesture sensing or gesture recognition.

In a further embodiment, the optical sensor arrangement is configured for proximity and gesture detection. The at least two sensor signals are evaluated for proximity and gesture detection. Proximity and gesture detection can also be named proximity and gesture sensing.

In an embodiment, the optical sensor arrangement operates in a non-contact mode. The at least two light sensors operate in the non-contact mode. The at least two light sensors detect non-contact gestures.

In an embodiment, the at least two light sensors are not comprised by a camera. The optical sensor arrangement is free of a camera.

BRIEF DESCRIPTION OF THE DRAWINGS

The following description of figures of exemplary embodiments may further illustrate and explain the invention. In so far as components, devices and method steps correspond to one another in terms of their function in different figures, the description thereof is not repeated for each of the following figures.

FIGS. 1A to 1D show exemplary embodiments of an optical sensor arrangement and signal characteristics;

FIGS. 2A to 2J show an exemplary embodiment of adaptive filters and an enter/exit thresholds process as well as corresponding signal characteristics;

FIGS. 6A to 6K show an exemplary embodiment of a gesture message processing and corresponding signal characteristics.

DETAILED DESCRIPTION

Figure 1A:
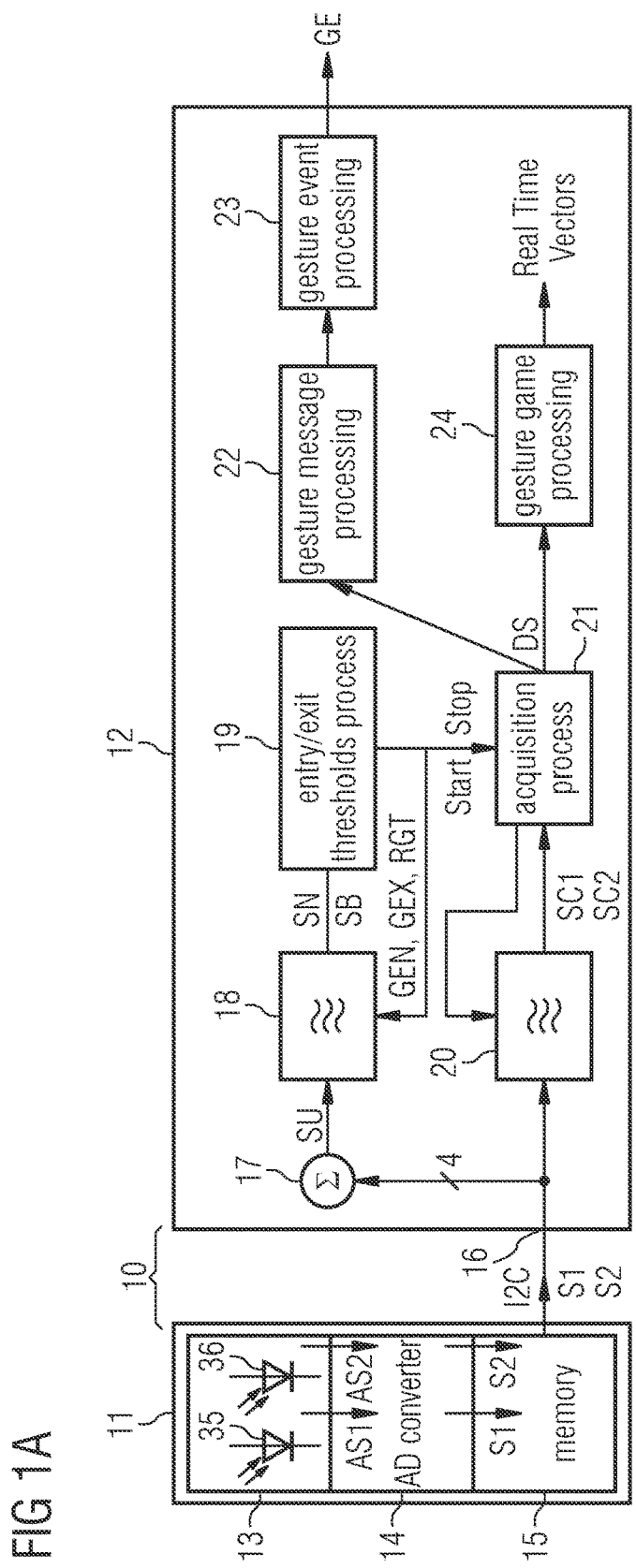

FIG. 1A shows an exemplary embodiment of an optical sensor arrangement 10. The optical sensor arrangement 10 comprises an input module 11 and an evaluation circuit 12. The input module 11 comprises a photodiode unit 13, an analog-to-digital converter 14 and a memory 15. The photodiode unit 13 comprises at least two light sensors 35, 36. The analog-to-digital converter 14, abbreviated ADC, couples the photodiode unit 13 to the memory 15. The memory 15 is realized as a First In First Out memory, abbreviated FIFO. The memory 15 comprises, for example, 128 bytes. An output of the memory 15 is connected to an output of the input module 11. The output of the input module 11 is coupled to an input 16 of the evaluation circuit 12. For the coupling between the input module 11 and the evaluation circuit 12 an Inter-Integrated Circuit bus, abbreviated I2C bus is used. The evaluation circuit 12 comprises a summation step 17, adaptive filters 18, an entry/exit thresholds process 19, crosstalk filters 20, an acquisition process 21, a gesture message processing 22, a gesture event processing 23 and a gesture game processing 24.

The evaluation circuit 12 is realized as a microprocessor. Therefore, the filters, blocks, units, steps and processes 17 to 24 of the evaluation circuit 12 shown in FIG. 1A and the following figures are implemented by processes or steps of a software which run on the microprocessor of the evaluation circuit 12. The microprocessor performs the processes and steps on-line.

The at least two light sensors 35, 36 generate at least two analog sensor signals AS1, AS2. The ADC 14 converts the at least two analog sensor signals AS1, AS2 into at least two sensor signals S1, S2 in digital form. The at least two sensor signals S1, S2 are stored in the memory 15. The input module 11 provides the at least two sensor signals S1, S2 to the input 16 of the evaluation circuit 12. The at least two sensor signals S1, S2 are summed by the summation step 17 resulting in a summing signal SU. The summing signal SU is provided to the adaptive filters 18. Output signals SN, SB of the adaptive filters 18 are provided to the entry/exit thresholds process 19 for generating a gesture entry threshold GEN and a gesture exit threshold GEX. Furthermore, the output signals SB, SN of the adaptive filters 18 are used by the enter/exit thresholds process 19 to provide a runtime gesture threshold RGT.

The at least two sensor signals S1, S2 are provided to the crosstalk filters 20. The crosstalk filters 20 generate at least two scaled sensor signals SC1, SC2 which are provided to the acquisition process 21. If one of the at least two scaled sensor signals SC1, SC2 is larger than the gesture entry threshold GEN, than the at least two scaled sensor signals SC1, SC2 are captured and further processed by the gesture message processing 22, the gesture event processing 23 and/or the gesture game processing 24. If each of the at least two scaled sensor signals SC1, SC2 is smaller than the gesture exit threshold GEX, than capturing of the at least two scaled sensor signals SC1, SC2 is stopped. The acquisition process 21 runs in real time. A data set DS generated by the acquisition process 21 is used by the gesture message processing 22 and the gesture event processing 23 to determine a gesture event GE. The data set DS of the acquisition process 21 are provided to the gesture game processing 24 for determination of real time vectors.

The optical sensor arrangement 10 provides data from the at least two light sensors 35, 36 comprising data that are proportional to the intensity of the at least two sensor signals S1, S2. The at least two sensor signals S1, S2 are processed to extract intensity changes. By the crosstalk filters 20, the at least two sensor signals S1, S2 are filtered and a DC component is subtracted.

In an alternative embodiment, the adaptive filters 18 and the crosstalk filters 20 are realized as digital filters. In addition, the evaluation circuit 12 comprises a summation unit 17', a enter/exit thresholds process unit 19', an acquisition process unit 21', a gesture message processing unit 22', a gesture event processing unit 23' and a gesture game processing unit 24' which are implemented using logical gates or state machines. Thus, the input 16 of the evaluation circuit 12 is coupled via the summation unit 17' to adaptive filters 18. An output of the adaptive filters 18' is coupled to the enter/exit thresholds process unit 19'. The input 16 of the evaluation circuit 12 is coupled to crosstalk filters 20. An output of the crosstalk filters 20 and an output of the enter/exit thresholds process unit 19' are connected to the acquisition process unit 21'. In addition, the output of the enter/exit thresholds process unit 19' is also connected to the adaptive filters 18. The acquisition process unit 21' is connected to the gesture message processing unit 22'. The gesture event processing unit 23' follows the gesture message processing unit 22'. The output of the acquisition process unit 21' is also connected to the gesture game processing unit 24. The acquisition process unit 21' is connected on its output side to the crosstalk filters 20'.

FIG. 1B shows an exemplary embodiment of the optical sensor arrangement 10 which is a further development of the optical sensor arrangement of FIG. 1A. The optical sensor arrangement 10 comprises a light-emitting diode 30, abbreviated LED. The LED 30 is for example realized as an infrared light-emitting diode. Furthermore, the optical sensor arrangement 10 comprises a current source 31 for supplying the LED 30. A series connection of the LED 30 and the current source 31 is connected between a supply voltage terminal 32 and a reference potential terminal 33. The photodiode unit 13 and the LED 30 are arranged in such a way that light emitted by the LED 30 which falls on an object 34 over the optical sensor arrangement 10 is reflected to the photodiode unit 13.

The photodiode unit 13 comprises the first, the second, a third and a fourth light sensor 35-38. The first to the fourth light sensor 35-38 are implemented as photodiodes. The first to the fourth light sensor 35 to 38 generate the first to the fourth sensor signals S1, S2, S3, S4. A multiplexer 39 connects the output of the four light sensors 35 to 38 to the ADC 14. The first light sensor 35 is sensitive in the north direction N and the second light sensor 35 is sensitive in the south direction S. Moreover, the third light sensor 37 is sensitive in the west direction W and the fourth light sensor 38 is sensitive in the east direction E. The first to the fourth sensor signals S1-S4 are provided to the crosstalk filters 20. Furthermore, the first to the fourth sensor signals S1-S4 are applied to the summation step 17. The first to the fourth sensor 35-38 detect light emitted by the LED 30 and reflected by the object 34.

Silicon integration allows four light sensors 35-38 to be placed on a single piece of silicon to detect light from different directions. Using this technology coupled with the single LED 30, the optical sensor arrangement 10 can detect motion over the device. To decode the light reflection into motion requires processing as outlined above.

In the overall optical sensor arrangement 10, data comes from the photodiodes 35-38 where the light is typically generated from an IR LED 30 that is pulsed such that it is reflected from the object 34 overhead and provides background subtraction and A/D conversion. The outputs from this process are the four samples S1-S4 from the NSEW directions. This data is then subsequently processed to extract the gesture information.

FIG. 1C shows an exemplary embodiment of a cross-section through the input module 11. The cross-section goes through the first and the second light sensor 35, 36. The input module 11 is covered by a transparent optical housing 40. The housing 40 has a lens 41 at its top. The first and the second light sensor 35, 36 are sensitive in opposite directions.

FIG. 1D shows an exemplary embodiment of a characteristic of the four sensor signals S1 to S4 depending on the time t. When the object 34 moves from the north to the south, the first sensor signal S1 has a peak that arises before the peak of the second sensor signal S2. The third and the fourth sensor signals S3, S4 are nearly similar and have a peak between the peak of the first sensor signal S1 and the peak of the second sensor signal S2. The four peaks optionally have the same height.

A hand can be an example of the object 34. The sensitivity to the direction provides different responses as the hand is passed over the four light sensors 35-38. For example, if the hand is waved from north to south, the response would ideally look similar to FIG. 1D.

Figure 2A:
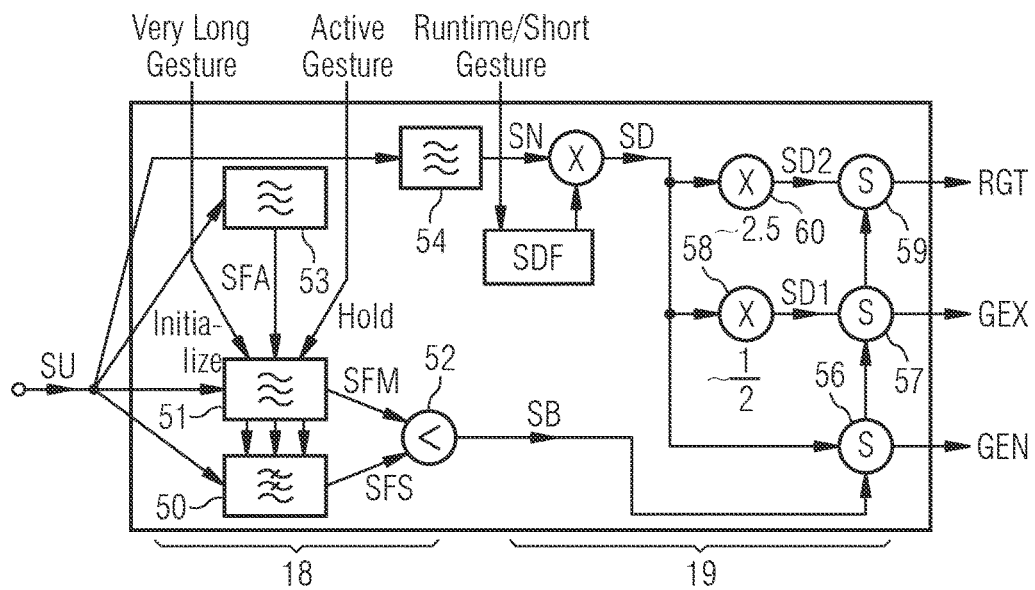

FIG. 2A shows an exemplary embodiment of the adaptive filters 18 and the enter/exit thresholds process 19. The adaptive filters 18 comprise a slow and a medium filter 50, 51. The slow and the medium filter 50, 51 are realized by low pass filtering. The cutoff frequency of the slow filter 50 is lower than the cutoff frequency of the medium filter 51. A slow filter signal SFS and a medium filter signal SFM are generated from the summing signal SU by the slow and the medium filter 50, 51. Moreover, a minimum detector 52 of the adaptive filters 18 receives the slow filter signal SFS and the medium filter signal SFM. A baseline signal SB is generated as a result of the minimum detector 52 that is provided to the enter/exit thresholds process 19. The baseline signal SB is the minimum of the slow filter signal SFS and the medium filter signal SFM. Moreover, the adaptive filters 18 comprise a fast averaging filter 53 that receives the summing signal SU and provides an averaging filter signal SFA to the medium filter 51. A signal representing a very long gesture initializes the medium filter 51. A signal representing an active gesture set a hold to the medium filter 51.

The fast averaging filter 53 may be realized by low pass filtering. The cutoff frequency of the medium filter 51 may be lower than the cutoff frequency of the fast averaging filter 53.

Furthermore, the adaptive filters 18 comprise a noise filter 54 that receives the summing signal SU. The noise filter 54 is designed for calculating the noise in the summing signal SU provided by the summation step 17. The noise filter 54 is realized as a dynamic standard deviation filter. A noise signal SN is generated out of the summing signals SU by the noise filter 54.

The enter/exit thresholds process 19 performs a noise multiplying 55 of the noise signal SN and a standard deviation factor SDF. A distance signal SD is generated by the noise multiplying 55. In the enter/exit thresholds process 19, the gesture entry threshold GEN is determined by a first summation 56 of the baseline signal SB and the distance signal SD. Furthermore, the exit gesture threshold GEX is determined by a first multiplying 58 of the distance signal SD with a first factor and by a first adding 57 of the thus multiplied distance signal SD1 to the gesture entry threshold GEN. Moreover, the runtime gesture threshold RGT is determined by a second multiplying 60 of the distance signal SD with a second factor and by a second adding 59 of the thus multiplied distance signal SD2 to the gesture exit threshold GEX. The first factor is, for example, 0.5, and the second factor is, for example, 2.5.

The minimum detector 52 generates the baseline signal SB which represents a baseline of the summing signal SU. Thus, the adaptive filters 18 can also be named a baseline filter. The distance signal SD is responsible for the distance between the gesture entry threshold GEN and the baseline signal SB.

In such an optical sensor arrangement 10, a critical component is the configuration of the baseline filter 18 and algorithm for adjusting the baseline signal SB due to dynamic system impact. This baseline signal SB is needed to determine when to start a gesture. An optional baseline architecture looks like FIG. 2A.

A decision regarding the presence of a gesture is typically made when the summing signal SU of the NSEW channels S1-S4, or any combination of those channels, exceeds a predetermined threshold such as the gesture entry threshold GEN. The baseline algorithm will provide an adaptive system such that when there is a change in the baseline, the gesture start threshold GEN, that is also named gesture entry threshold, also changes. FIGS. 2G and 2H show an example of two gesture responses where the second response resulted in a baseline shift. Without an adaptive algorithm, the optical sensor arrangement 10 would never come out of a gesture mode. The baseline signal SB must be shifted upward to accommodate this shift. Another example may be humidity slowly building on the glass and the case such that the baseline signal SB slowly increases. A further example of a problem condition is when the baseline signal SB is too close to the gesture entry threshold GEN causing several invalid gestures to be generated as shown in FIGS. 2I and 2J.

The first step for generation of the gesture entry threshold GEN in the adaptive filters 18, also called baseline filter, is to direct the available information to the baseline system. The input to the system is the NSEW data of the four sensor signals S1-S4 in any combination of components. Typically, this would be the sum of all four sensors signals S1-S4, but it could also be the sum of a subset if determined that this would improve performance. For example, the first and the second sensor signals S1, S2 could have a very high crosstalk and the third and the fourth sensor signals S3, S4 could have a much lower crosstalk. The third and the fourth sensor signals S3, S4 could be used alone for the input in this situation. While there are many gesture feedback conditions that could be considered, two of them will be handled as special conditions: a long gesture and a short gesture.

The basic algorithm for the baseline signal SB will be a dual filter system with the medium filter 51 and the slow filter 50. The adaptive filters 18 are designed such that the baseline signal SB will increase slowly but rapidly decrease or have a slow attach and a rapid decay. This can be implemented using the medium and the slow filter 50, 51 and select the minimum of both filter signals SFM, SFS.

With the special condition of an excessively long gesture, a gesture engine comprising the adaptive filters 18 and the entry/exit thresholds process 19 will never exit the gesture mode causing the optical sensor arrangement 10 to hand or repetitive gesture held conditions. In this case, the optical sensor arrangement 10 generates a long gesture abort and the feedback to the baseline signal SB would be to rapidly change the baseline signal SB to a higher level. For the special condition of excessively short gestures, the difference signal SD, also named threshold offset, may need to be increased as this may be due to increased system noise.

Referring to the noise filter 54, to develop the thresholds GEN, GEX above the baseline signal SB, the noise in the incoming data must be determined. To do so, a standard deviation over a number of samples is calculated. With this system, samples are not stored, so a dynamic standard deviation filter is needed. Standard deviation is calculated as:

$$SN = \text{Sqrt}(\text{Sum}(A'^{*}A' + B'^{*}B' + C'^{*}C' \ldots )),$$

where $A' = A - \text{avg}, B' = B - \text{avg}, C' = C - \text{avg}$

The square root, abbreviated sqrt, is the last step, therefore, it will be ignored for the time being, resulting in the equation:

$$SN = \text{Sum}(A'^{*}A' + B'^{*}B' + C'^{*}C' \ldots )$$

A, B and C are the values of the first, second and third sensor signals S1, S2, S3. If an offset data such as offset-compensated sensor signals SO1-SO4 are used, the average of A=B=C . . . will be zero. The sum can then become a running sum of squares. With filtering, the following filtered standard deviation is provided:

$A$ = Current Sample, $B$ = Last Filter Output $$SN = \text{Running Sum} = A^{*}A^{*}0.1 + B^{*}B^{*}0.9;$$

The current standard deviation is the square root of the running sum. The filter factor can be changed to adapt at an optimal rate.

Alternatively, a value D of the fourth sensor signal S4 is additionally used for the calculation, using the equations:

$$SN = \text{Sqrt}(\text{Sum}(A'^{*}A' + B'^{*}B' + C'^{*}C' + D'^{*}D')) \text{ or}$$

$$SN = \text{Sum}(A'^{*}A' + B'^{*}B' + C'^{*}C' + D'^{*}D') \text{ with } D' = D - \text{avg}$$

The first to the fourth sensor signals S1, S2, S3, S4 are filtered by the adaptive filters 18. The adaptive filters 18 are slow, medium and/or fast filters such as the first and the medium filter 50, 51 and the fast averaging filter 53. The filters 50, 51, 53 are enabled by an input signal. The filters 50, 51, 53 are initialized by an input signal. The first and the medium filter 50, 51 are initialized to the output of the fast averaging filter 53 which implements the fast filter. The adaptive filters 18 comprise a standard deviation filter that is realized, for example, as the noise filter 54. The standard deviation filter is enabled by an input signal. The standard deviation filter 54 is enabled by the slow filter stability.

The filters 50, 51, 53 are used to determine thresholds to enable further processing of the first to fourth sensor signals S1 to S4. The slow and the medium filters 50, 51 are used in a multiple speed algorithm. The slow filter 50 is used to increase the threshold such as the gesture entry threshold GEN and the medium filter 51 is used to decrease the baseline SB. The standard deviation filter 54 is used in combination with the baseline signal SB to determine a threshold such as the gesture entry threshold GEN. The noise signal SN can also be called a standard deviation signal. The standard deviation filter is realized as the noise filter 54. The standard deviation signal is determined from the standard deviation filter.

The noise signal SN is multiplied by a noise factor which is added to the baseline. The noise multiplying 55 may be increased using an external signal. Alternatively, the noise multiplying 55 may be decreased using an external signal. Thresholds are used to determine a start and stop for capturing data. For example, the gesture entry threshold GEN determines a start for capturing data and the gesture exit threshold GEX determines a stop for capturing data. "Gesture entry threshold" may also be named a "gesture start threshold". The gesture entry threshold GEN may be equal to the gesture exit threshold GEX.

In an alternative embodiment, the noise signal SN which represents the standard deviation, is determined from a preset value. Thus, the standard deviation filter 54 is omitted.

Figure 2B:
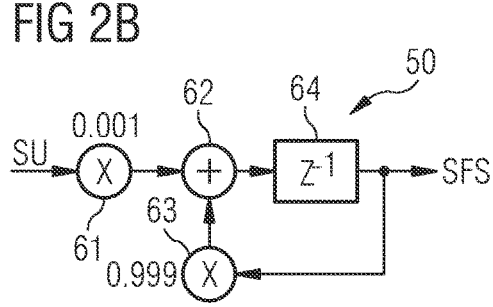
Figure 2C:
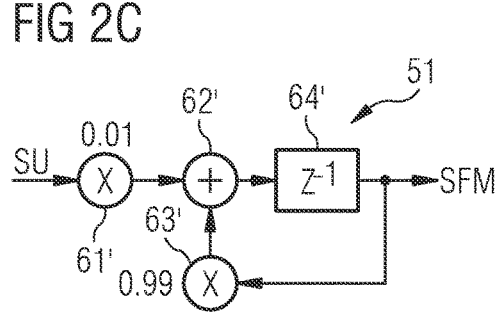
Figure 2D:
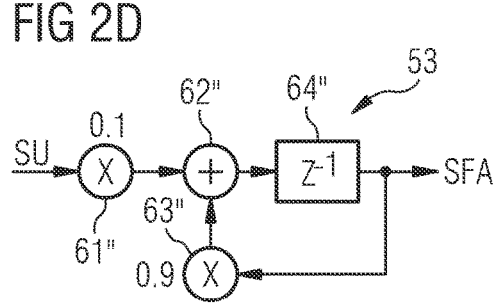
Figure 2G:
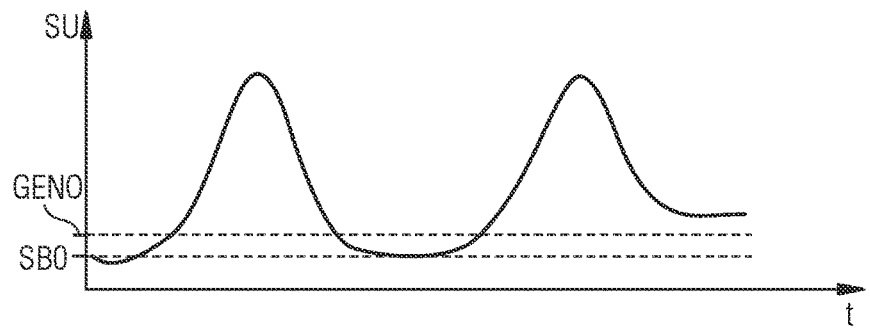
Figure 2H:
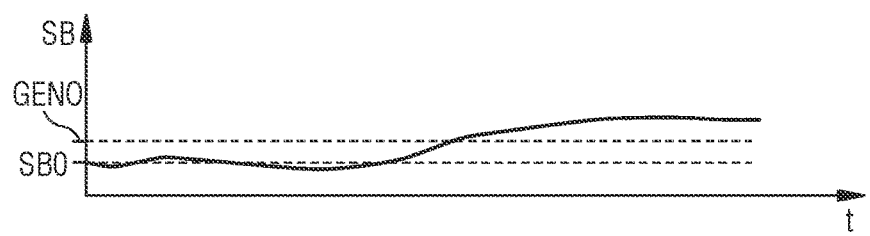
Figure 2I:
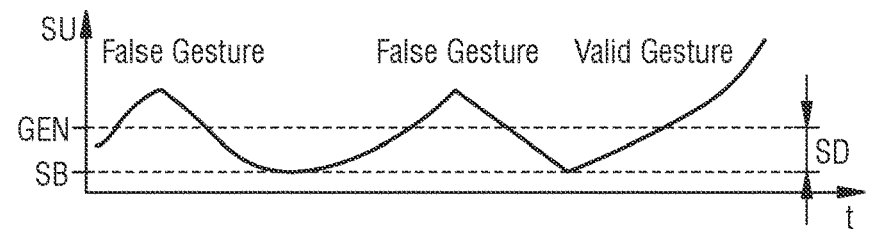
Figure 2J:
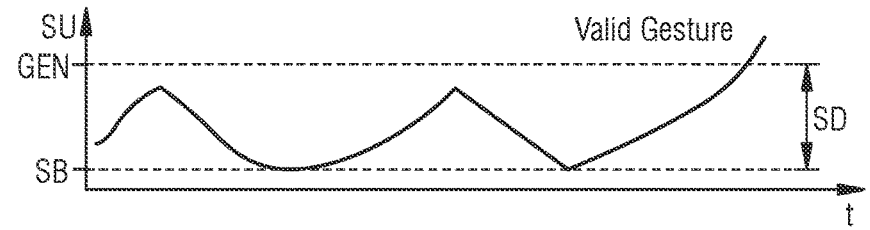

FIGS. 2B, 2C and 2D show exemplary embodiments of the slow and the medium filter 50, 51 and of the fast averaging filter 53. The basic construction of the three filters 50, 51, 53 is identical. As shown in FIG. 2B, the slow filter 50 comprises a first filter multiplier 61, a filter adder 62, a second filter multiplier 63 and a delay unit 64. The input of the slow filter 50 is coupled via the first filter multiplier 61 to one input of the filter adder 62. The delay unit 64 couples an output of the filter adder 62 to the output of the slow filter 50. The output of the slow filter 50 is coupled via the second filter multiplier 63 to a second input of the filter adder 62. The first filter multiplier 61 performs a multiplication by a first filter factor, whereas the second filter multiplier 63 is designed for multiplication with a second filter factor.

In the case of the slow filter 50, the first filter factor is, for example, 0.001 and the second filter factor is, for example, 0.999. According to FIG. 2B, the medium filter 51 has for example a first filter factor 0.01 and a second filter factor 0.99. According to FIG. 2D, the fast averaging filter 53 implements for example a first filter factor 0.1 and a second filter factor 0.9.

One of the most important factors and parameters that need to be programmable are the time constants associated with the filters such as the filters 50, 51, 53. The sample time of the ADC 14 will set the basic timing of the optical sensor arrangement 10 and when it changes, the filter timing must also change. Therefore, the filter coefficients or factors must be changed when the sampling time changes.

The selection of the time constants is highly dependent on human factors. One of the factors impacting time constant selection is the gesture vocabulary. If the vocabulary includes button pushes, long gestures are possible. If push buttons are not needed, then the time constants can be much faster. If push buttons are considered, then there must be a decision regarding the longest button hold time before considering this an error condition and aborting the gesture. This time constant could be as long as 10 seconds. This is also impacted by the longest time that the gesture engine could be stalled and not making valid gestures. In order to determine the right coefficients for the specific time constant, the definition of time constant must also be stated. Another consideration is that the time constant must be much slower than the slowest sampling time or else the filters 50, 51, 53 do not provide any value.

FIG. 2E shows an exemplary embodiment of a cross-section of the input module 11, whereas a disturbing object 65 is on top of the housing 40. The disturbing object 65 influences the second light sensor 36 which is sensitive in the south direction.

FIG. 2F shows an exemplary embodiment of signal characteristics depending on the time. Comparable to FIG. 1D, the peak of the first signal S1 is before the peak of the second sensor signal S2. However, the height of the peak of the second sensor signal S2 is lower than the peak of the first sensor signal S1. The third and the fourth sensor signals S3, S4 have peaks which can be detected between the peak of the first sensor signal S1 and the peak of the second sensor signal S2. Due to the influence of the disturbing object 65, the peak of the third sensor signal S3 is lower than the peak of the fourth sensor signal S4.

The baseline will change due to many different factors. The optical sensor arrangement 10 itself is optionally designed to have some positive offset to ensure that accurate data is available even with no object 34 present. Moreover, the optical sensor arrangement 10 is typically placed behind glass with ink that will cause some crosstalk and the ink will introduce part-to-part variation. Another change can occur if the glass over the light sensors 35-38 is scratched. These are typically permanent changes.

A further set of change may be semi-permanent or semi-static. A phone may comprise the optical sensor arrangement 19. One example might be operation in an airplane with the phone on the tray and the seatback in front of you leaned back. This condition would exist over a long period but eventually be removed. Another example could be if a person had make-up on and the make-up was transferred to the phone. This would remain until removed. Other more dynamic factors are when a person uses the optical sensor arrangement 10 behind glass in a different configuration. For example, if the optical sensor arrangement 10 is in a cell phone, it could be used when a person is exercising and sweat could come in contact with the glass over the light sensors 35-38 causing distortion. When the sweat is removed, the baseline signal SB will change again. FIGS. 2E and 2F show an example of the response from a phone with a non-ideal baseline condition.

FIGS. 2G and 2H show exemplary embodiments of a signal characteristic depending on the time t. As shown in FIG. 2G, the summing signal SU is generated by two gestures, whereas during the second gesture a baseline shift occurs. As shown in FIG. 2H, the baseline signal SB is amended by means of the adaptive filters 18. The dashed lines in FIGS. 2G and 2H show a value SB0 of the baseline signal SB and a value GEN0 of the gesture entry threshold GEN at the start of the first gesture. The baseline signal SB, and thus the gesture entry threshold GEN, are adapted by means of the adaptive filters 18 and the enter/exit thresholds process 19. The adaptation of the gesture entry threshold GEN may correct a drift of the sensor signals S1-S4. The drift may be caused by a changing surrounding. Thus, gestures may be better detected.

FIGS. 2I and 2J show an exemplary embodiment of a characteristic of the summing signal SU over the time t. Whereas in FIG. 2I the difference signal SD has a small value, the difference signal SD obtains a higher value in the FIG. 2J. Due to the small value of the difference signal SD disturbances in the summing signal SU result in two false gestures, shown in FIG. 2I. These false gestures can be avoided by a higher value of the difference signal SD as shown in FIG. 2J.

Figure 3A:
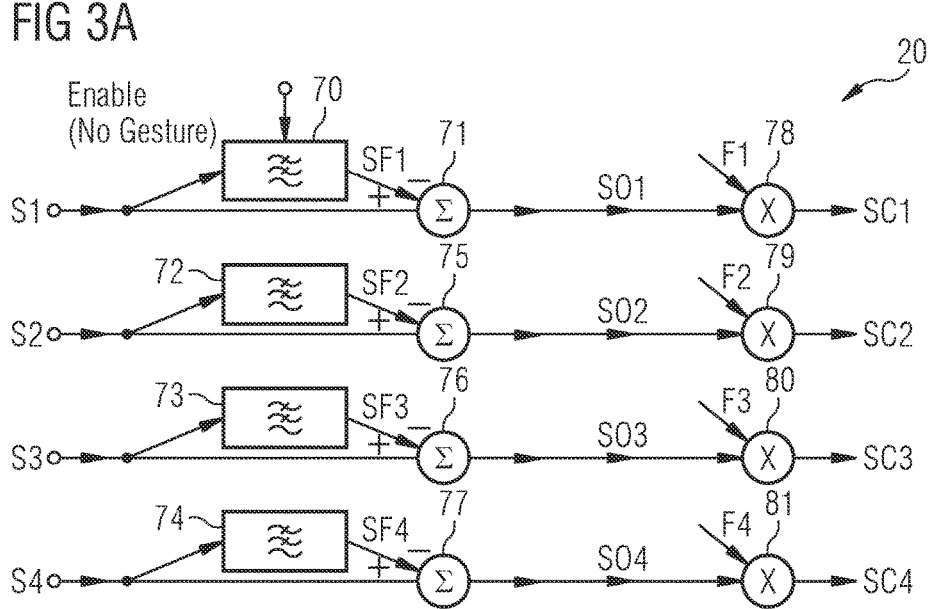
FIGS. 3A to 3C show an exemplary embodiment of crosstalk filters and corresponding signal characteristics.

FIG. 3A shows an exemplary embodiment of the crosstalk filters 20. The crosstalk filters 20 comprises four channels for processing the first to the fourth sensor signal S1-S4. The first channel comprises a first slow filter 70 and a first subtracting unit 71. The first sensor signal S1 is processed by the first channel of the crosstalk filters 20. A first filtered signal SF1 is generated by filtering the first sensor signal S1 by the first slow filter 70. The first sensor signal S1 is directly applied to a non-subtracting input of the subtracting unit 71. The first filtered signal SF1 is fed to a subtracting input of the first subtracting unit 71. The first subtracting unit 71 outputs a first offset-compensated sensor signal SO1. Thus, the first offset-compensated sensor signal SO1 is determined by subtracting the first filtered signal SF1 from the first sensor signals S1.

The other channels operate in a corresponding way. The crosstalk filters 20 comprise a second, a third and a fourth slow filter 72, 73, 74 as well as a second, a third and a fourth subtracting unit 75, 76, 77 which are arranged corresponding to the first slow filter 70 and the first subtracting unit 71. Thus, the crosstalk filters 20 also generate a second, a third and a fourth offset-compensated sensor signal SO2, SO3, SO4 by subtracting a second to fourth filtered signal SF2-SF4 from the second to the fourth sensor signal S2-S4. The slow filters 70, 72, 73, 74 estimate the DC value of the first to the fourth sensor signal S1-S4. The first to the fourth slow filters 70, 72, 73, 74 perform a low-pass filtering. An enable signal which enables the operation of the filters only in case a gesture is not present, is provided to the first to the fourth slow filters 70, 72, 73, 74. The four scaled sensor signals SC1-SC4 a determined by a DC-filtering of the four sensor signals S1-S4 by the four slow filters 70, 72-74 and the four subtracting units 71, 75-77.

In addition, the first channel of the crosstalk filters 20 comprise a first crosstalk multiplier 78. The first offset-compensated sensor signal SO1 and a first scale factor F1 is applied to an input of the first crosstalk multiplier 78. Thus, a first scaled sensor signal SC1 is generated by a multiplication of the first offset-compensated sensor signal SO1 and the first scale factor F1 by the first crosstalk multiplier 78. Correspondingly, the crosstalk filters 20 comprise a second, a third and a fourth crosstalk multiplier 79, 80, 81. Thus, a second, a third and a fourth scaled sensor signal SC2, SC3, SC4 are generated by a multiplication of the second, the third and the fourth offset-compensated sensor signal SO2, SO3, SO4 with a second to a fourth scale factor F2-F4 using the second, third and fourth crosstalk multiplier 79, 80, 81, respectively.

The crosstalk filters 20 perform a dynamic cancellation of the DC offset and adjusting the scaling to equalize the different channels. FIG. 3A describes a DC offset and scaling architecture. The output S1-S4 from the data acquisition front end is filtered to produce an average value SF1-SF4 which is subtracted from the data S1-S2 to remove the DC component. This filter 20 has two components: a component which is fed back to the analog front end to ensure a slightly positive offset to the data coming into the system and a second component 71, 75-77 which will subtract the average data SF1-SF4 from the raw data S1-S4 to provide a DC offset data. The data SO1-SO4 must be slightly positive or else the value of that information is unknown since in most systems it is unknown how far negative the raw data S1-S4 is below a zero value. Moreover, the feedback to the analog front end is critical to eliminate any positive offset due to optical crosstalk. This increases the dynamic range of the optical sensor arrangement 10.

Throughout the text, the term "data" may mean the four sensor signals S1-S4 or signals derived from the four sensor signals S1-S4 such as the four filtered signals SF1-SF4, the four offset-compensated sensor signals SO1-SO4 or the four scaled sensor signals SC1-SC4 depending on the context.

In an alternative not shown embodiment, the crosstalk filters 20 comprise an offset register coupled to the non-subtracting input of the first subtracting unit 71. Alternatively, the offset register couples the first filter 70 to the first subtracting unit 71. The second to the fourth channel comprise corresponding registers. The programmable offset register allows adjustment of each channel's offset.

Figure 3B:
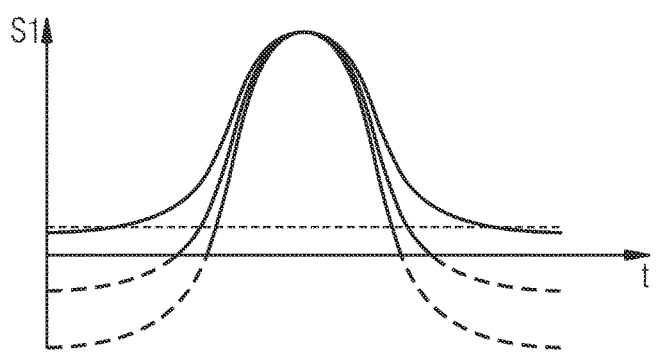
Figure 3C:
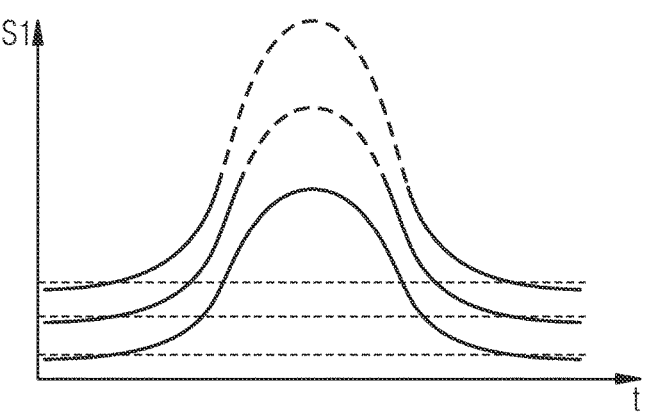

FIGS. 3B and 3C show exemplary characteristics of the first sensor signal 51. In FIGS. 3B and 3C, conditions that could occur with positive or negative offset are illustrated. The topmost curve in FIG. 3B is suitable for further processing, whereas the two other curves show a negative offset which has to be eliminated by the crosstalk filters 20. In FIG. 3C, the lowest curve can be used for further processing, whereas the two other curves have a positive offset which is too high and which has to be reduced by the crosstalk filters 20. Optionally, the offset-compensated signals SO1, SO2, SO3, SO4 have a small positive offset. The slow filters 70, 72, 73, 74 are designed in such a manner that the offset-compensated sensor signals SO1-SO4 are provided with a small positive offset.

Figure 4A:
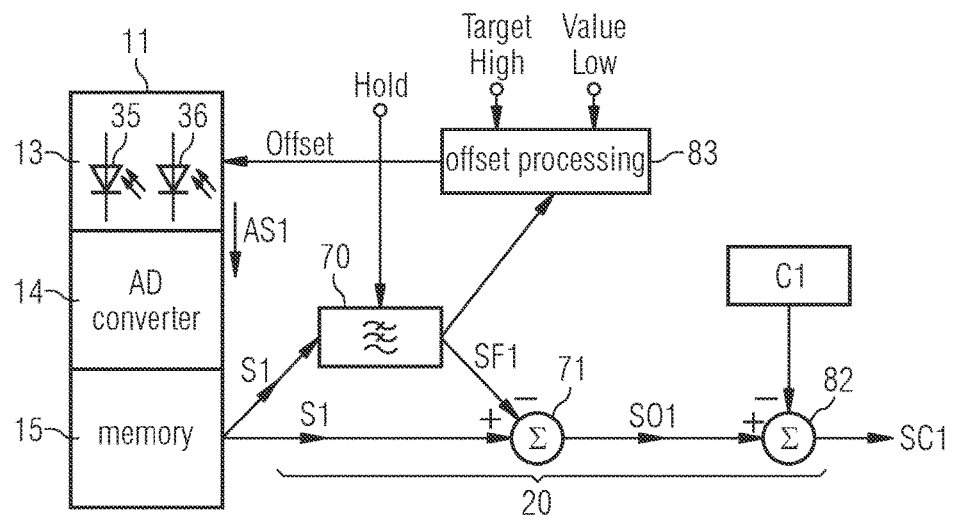
FIGS. 4A to 4C show an alternative embodiment of the crosstalk filters and corresponding signal characteristics.
Figure 4B:
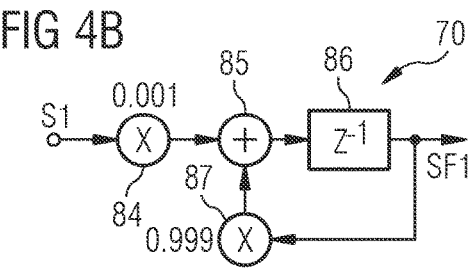
Figure 4C:
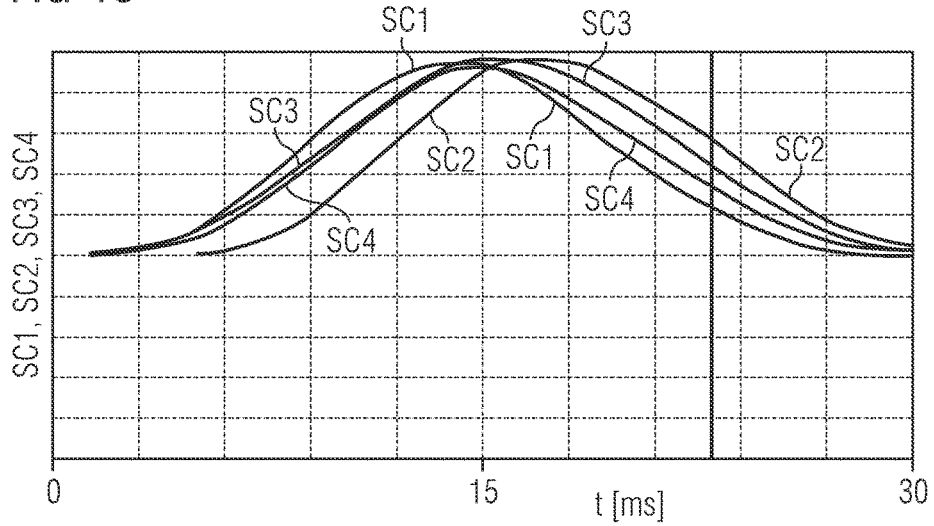

FIGS. 4A to 4C shown an alternative exemplary embodiment of the crosstalk filters 20. For ease of understanding, only the first channel for processing of the first sensor signal S1 is shown. The first crosstalk multiplier 78 as shown in FIG. 3A is omitted. Instead, the offset compensated sensor signal SO1 is fed to a non-subtracting input of a further first subtracting unit 82. A first scaling coefficient C1 is provided to a subtracting input of the further first subtracting unit 82. The first scaled sensor signal SC1 is determined by subtracting the first scaling coefficient C1 from the first offset-compensated sensor signal SO1 by the further first subtracting unit 82. An offset processing 83 is performed using the first filtered signal SF1. The result of the offset processing 83 is fed to the photodiode unit 13 and thus to the first light sensor 35. A target high value and a target low value are used in the offset processing 83. The processing of the second to the fourth sensor signal S2 to S4 occurs correspondingly using a second to a fourth scaling coefficient C2-C4. The filtered signals SF1-SF4 are used to determine the target value for the analog frontend. The analog frontend comprises the input module 11. The target is increased if the value is below a low target value. The target is decreased if the value is above a high target value. Overall offset is an issue, but channel to channel offset differences also cause problems. The crosstalk filters 20 solve the problem with different offsets to different channels.

FIG. 4B shows an exemplary embodiment of the first slow filter 70. The second to the fourth slow filter 72-74 operate such as the first slow filter 70. The first slow filter 70 is constructed in a similar way as the slow filter 50 that is embedded in the adaptive filters 18. The first slow filter 70 comprises a first multiplier 84, an adder 85, a delay unit 86 and a second multiplier 87. The first sensor signal S1 is multiplied by the first multiplier 84 such that the multiplied sensor signal is applied to an input of the adder 85. An output of the adder 85 is coupled via the delay circuit 86 to an output of the first slow filter 70. The output of the first slow filter 70 is coupled via the second multiplier 87 to a further input of the adder 85. A first multiplying factor, e.g. 0.001, is applied to the first multiplier 84, whereas a second multiplying factor, such as 0.999, is applied to the second multiply unit 87.

Some of the most important factors and parameters that need to be programmable, are the time constants associated with the slow filters 70, 72-74. The sample time of the ADC 14 sets the basic timing of the optical sensor arrangement 10, and it must also change when the filter timing changes. Therefore, the filter coefficients must be changed when the sampling time changes.

FIG. 4C shows an exemplary characteristic of the first to the fourth scaled sensor signals SC1-SC4. All four scaled sensor signals SC1 to SC4 arise from the same baseline and obtain the same peak value.

Figure 5A:
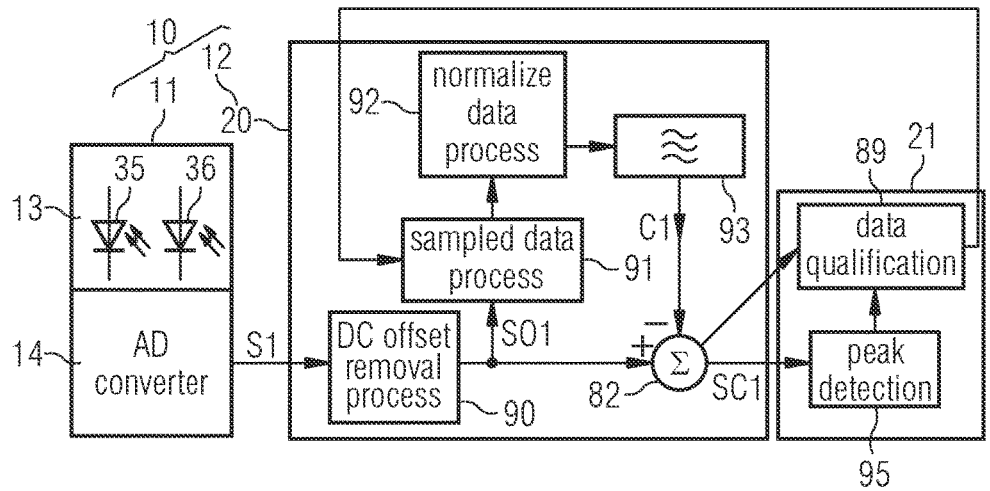
FIGS. 5A to 5C show a further exemplary embodiment of the optical sensor arrangement.

FIG. 5A shows an exemplary alternative embodiment of the optical sensor arrangement 10. The input module 11 does not comprise the memory 15. The ADC 14 is directly connected via the input 16 of the evaluation circuit 12 to the crosstalk filters 20. The crosstalk filters 20 comprise a DC offset removal process 90. The DC offset removal process 90 can be implemented using the first to the fourth slow filter 70, 72 to 74 and the first to the fourth subtracting units 70, 75 to 77. The DC offset removal process 90 provides a first offset-compensated sensor signal S01 to the further first subtraction unit 82. The first scaling coefficient C1 is provided to the subtracting input of the first further subtraction unit 82. Whereas in FIG. 4A the first scaling coefficient C1 has a predetermined value, the first scaling coefficient C1 is variable in FIG. 5A.

The first offset-compensated sensor signal SO1 is processed by a sampled data process 91, a normalize data process 92 and a coefficient filter 93. The first scaling coefficient C1 is calculated by sampling the first offset-compensated sensor signal SO1, normalizing the signal and filtering the signal. Advantageously, the first scaling coefficient C1 is time-dependent and reduces the influence of the surroundings of the optical sensor arrangement 10. The second to the fourth scaling coefficients C2-C4 are generated in a corresponding manner.

The first to the fourth scaled sensor signals SC1-SC4 are provided to the acquisition unit 21. The first to the fourth scaled sensor signals SC1-SC4 are processed by a peak detection 95. Furthermore, the result of the peak detection 95 and the four scaled sensor signals SC1-SC4 are processed by a data qualification 89. A result of the data qualification 89 is used for the sampling of the offset-compensated sensor signals SO1-SO4. Thus, in FIG. 5B, an alternative DC offset and scaling architecture is provided.

The filtered data such as the first to the fourth sensor signals S1 to S4 are part of a gesture optical sensor arrangement 10. The gesture is started when the data is above the gesture start threshold GEN. The gesture is ended when the data falls below the gesture stop threshold GEX. The scaled filtered data, such as the first to the fourth scaled sensor signals SC1-SC4, is processed by the gesture optical sensor arrangement 10, for example by the gesture message processing 22. The gesture optical sensor arrangement 10 provides feedback to further qualify the sample point. The gesture optical sensor arrangement 10 provides feedback to recalibrate the optical sensor arrangement 10. Coefficients, such as the first to the fourth scaling coefficient C1-C4 or the first to the fourth scale factors F1-F4, are stored in a long-term memory and are initialized during the next gesture system start. The filtered signals SF1 to SF4 are further processed to determine the maximum value of the sensor signals between the start and end indication. The peak data point is used to capture the raw data at said peak and/or the offset data at said peak. The peak data is qualified with some system parameters. The system qualification parameters are above a threshold and/or are below a maximum threshold. The peak data values are normalized to provide scaling factors such as the scaling factors F1-F4 provided to the crosstalk multipliers 78 to 81. The normalized scaling factors F1-F4 are calculated by filtering. The filtered scaling factors are used to scale the raw or offset data. The data is acquired in a register; the maximum point and the number of accumulated points are processed.

Figure 5B:
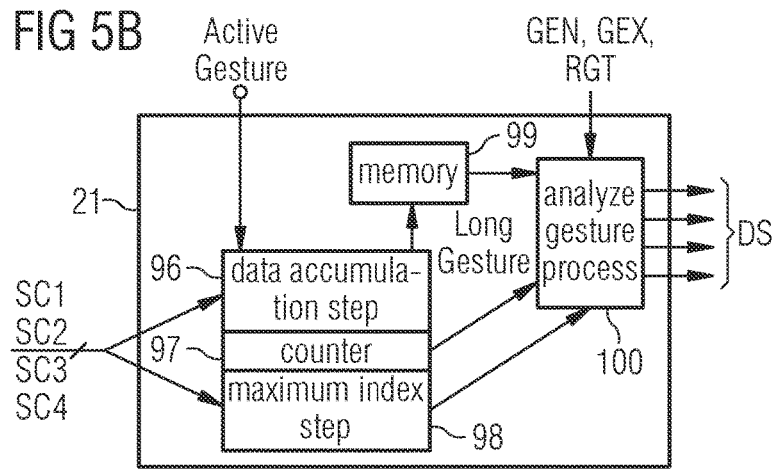

FIG. 5B shows an exemplary embodiment of the acquisition process 21. In the acquisition process 21, an analyze gesture process 100 determines the data set DS having the information such as "long gesture", "good gesture", "abort gesture", and/or "runtime/short gesture". For this purpose, a data accumulation step 96 is performed using the first to the fourth scaled sensor signals SC1-SC4. A signal indicating an active gesture is used in the data accumulation step 96. The result of the data accumulation step 96 is stored in a memory 99. Moreover, a maximum index step 98 is performed using the first to the fourth scaled sensor signals SC1-SC4. The analyzed gesture process 100 uses the content of the memory 99, the result of a counter 97, the result of the maximum index step 98 and a signal indicating the runtime gesture threshold RGT. The data set DS indicating a long gesture, a good gesture, an abort gesture and/or a runtime/short gesture is fed to the gesture message processing 22.

The data processing determines if the number of samples is below a threshold indicating a short gesture. The data processing determines if the maximum level of the gesture falls below a predetermined threshold. The data processing determines if the gesture length exceeds a predetermined threshold. Moreover, the data processing determines if the gesture is a normal good gesture. The runtime gestures are further processed to determine if the number of invalid runtime gestures exceeds the number of acceptable runtime gestures over a period of time. The short gestures are further processed to determine if the number of invalid short gestures exceeds the number of acceptable short gestures over a period of time.

The optical sensor arrangement 10 is sensitive in four directional components: north, south, east and west. The sensor signals are used with data proportional to the intensity of the input. The data is part of a system with input indicating the start and end of data acquisition. The four directions of data are acquired and stored in a memory subsystem.

Figure 5C:
Figure 5C:
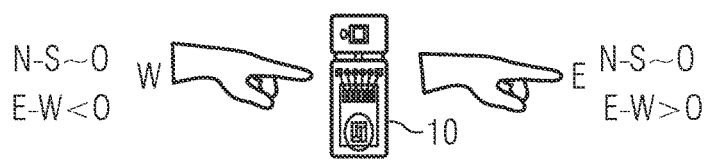
Figure 5C:
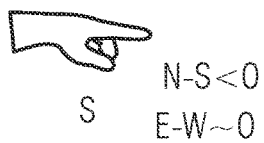

FIG. 5C shows an exemplary embodiment of a sensor response to the four directions. The sensor response can be written as a vector. The first coordinate of the vector is the north to south strength NSs, abbreviated N-S strength. The N-S strength NSs can be calculated according to the following equation:

$$NSs=(N-S)/(N+S)$$

The second coordinate of the vector is the east to west strength EWs, abbreviated E-W strength. The E-W strength EWs can be calculated according to the following equation:

$$EWs=(E-W)/(E+W)$$

The first value N depends on the first sensor signal S1 or on a signal derived from the first sensor signal S1 such as the first scaled sensor signal SC1 or the first offset-compensated sensor signal SO1. Correspondingly, the second value S depends on the second sensor signal S2 or on a signal derived from the second sensor signal S2 such as the second scaled sensor signal SC2 or the second offset-compensated sensor signal SO2.

Similarly, the third value W depends on the third sensor signal S3 or on a signal derived from the third sensor signal S3 such as the third scaled sensor signal SC3 or the third offset-compensated sensor signal SO3. The fourth value E depends on the fourth sensor signal S4 or on a signal derived from the fourth sensor signal S4 such as the fourth scaled sensor signal SC4 or the fourth offset-compensated sensor signal SO4.

As can be seen in FIG. 5C, a movement of the object 34 from the north to the south leads to a positive N-S strength and an east to west strength which is nearly zero. A movement of the object 34 from the south to the north results in a negative N-S strength and an E-W strength of approximately zero. Correspondingly, a movement of the object 34 from the west to the east leads to an N-S strength of approximately zero and to an E-W strength that is negative. A movement of the object 34 from the east to the west results in an N-S strength that is approximately zero and a positive E-W strength. The object 34 can, for example, be a person's hand.

Thus, there is a direct mapping from the normalized N-S strength and the normalized E-W strength to provide a vector indicating the position of the hand relative to the optical sensor arrangement 10, for example above the optical sensor arrangement 10. The N-S strength and the E-W strength are translated to polar coordinates giving a direction and magnitude for the vector.

If the optical sensor arrangement 10 only needs two of the four directions, the other two directions can be forced to zero giving two directions plus the magnitude. The magnitude and direction are:

$$Dir=\arctan(NSs/EWs),$$

$$Mag=\text{sqrt}(NSs*NSs+EWs*EWs)$$

There is a direct mapping from the normalized N-S strength and the normalized E-W strength to provide a vector indicating the position of the hand relative to the optical sensor arrangement 10, for example above the arrangement 10.

Figure 6A:
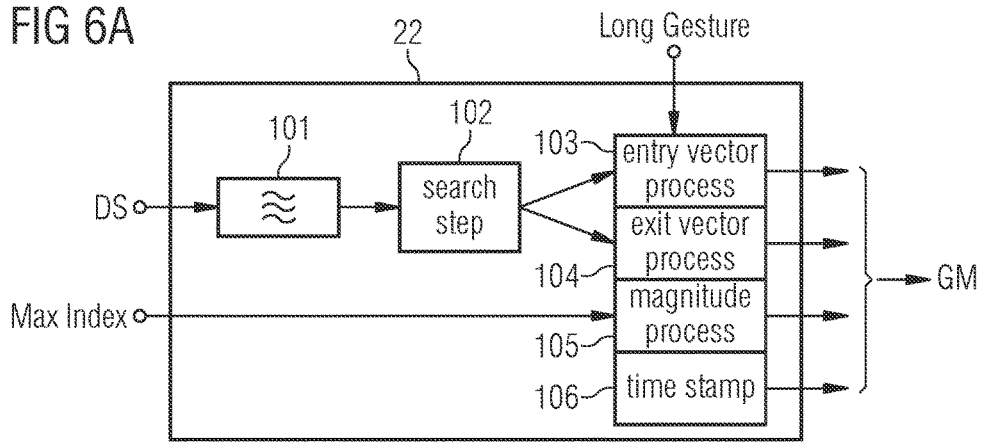

FIG. 6A shows an exemplary embodiment of the gesture message processing 22. As a result the gesture message processing 22 determines a gesture message GM using the data set DS that is also named a good gesture data set. The data set DS may, for example, be provided by the memory 99. The data set DS is processed by a gesture filtering 101 and a search step 102 for an entry/exit vector index. The result of the search step 102 is used in an entry vector process 103 and an exit vector process 104. Moreover, the gesture message processing 22 comprises a magnitude process 105 which uses a maximum index. The gesture message processing 22 comprises a time stamp 106. The gesture message GM results from the entry vector process 103, the exit vector process 104, the magnitude process 105 and the timestamp 106.

Figure 6B:
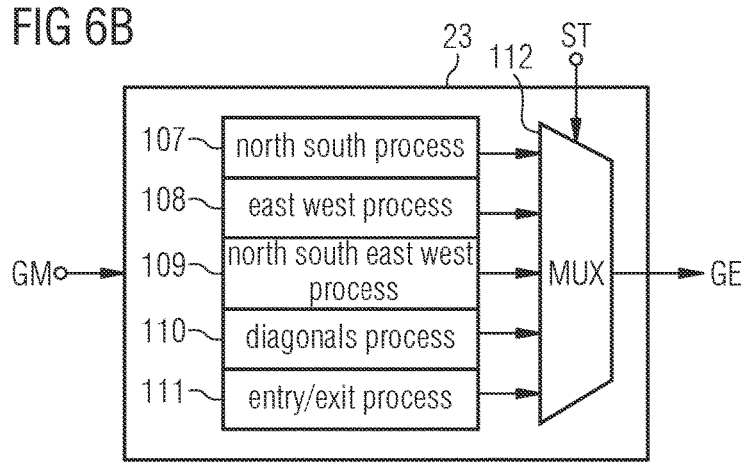

FIG. 6B shows an exemplary embodiment of the gesture event processing 23. The gesture message GM is further processed by the gesture event processing 23 resulting in the gesture event GE. For this purpose, the gesture message GM is used in a north south process 107, in an east west process 108, in a north south east west process 109, in a diagonals process 110 and in an entry/exit process 111. The gesture event GE is determined by selecting a result of these five processes 107 to 111 by a multiplexing process 112 which is controlled by a type signal ST.

Figure 6C:
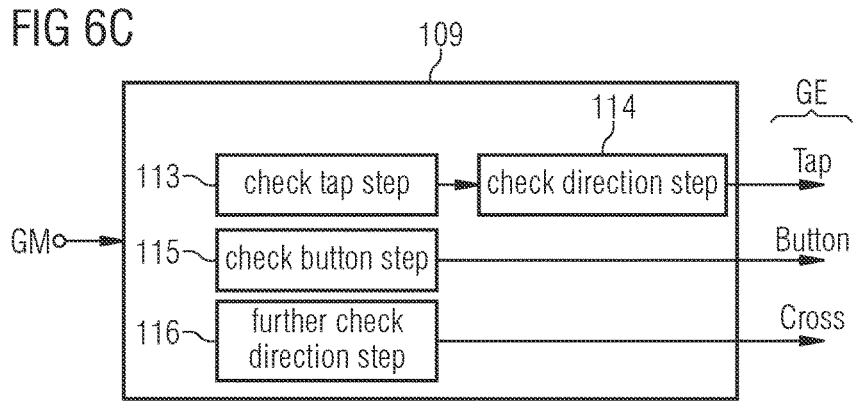

FIG. 6C shows an exemplary embodiment of the north south east west process 109, abbreviated NSEW process. The NSEW process 109 uses the gesture message GM for providing the gesture event GE with the information whether the gesture is a tap, a button or a cross. The tap is detected by a check tap step 113 and a check direction step 114. The button is received by a check button step 115. The cross is derived by a further check direction step 116.

The optical sensor arrangement 10 is designed to operate according to a processing method. The processing method comprises a single point for a short gesture. The processing method may search for a percentage of the peak value. The entry is searched from the beginning of a gesture. The exit is searched starting from the end of the gesture. The data is averaged to reduce noise.

The optical sensor arrangement 10 is sensitive in four shadow components, such as shadow north, shadow south, shadow east and shadow west. The optical sensor arrangement 10 provides data from the four light sensors 35-38 comprising data proportional to the intensity of the input. The data is part of a system with input indicated the start and end of data acquisition. The four direction of data are acquired and stored in a memory subsystem, such as the memory 99. The shadow north—shadow south directions are processed to generate a differential value N-S. The shadow east—shadow west direction are processed to generate a differential value E-W. The N-S and E-W data is normalized by dividing by (N+S) or (E+W). The N-S and E-W data is normalized by dividing by (N+S+E+W)/2. The shadow north—shadow south directions are processed to generate a differential value (N-S). The shadow east—shadow west direction are processed to generate a differential value (E-W). The N-S and E-W data is used to form a vector and magnitude indicating the direction of the data.

The entry and exit vectors ENV, EXV are processed against N/S criteria to provide a N-S or S-N gesture, against E/W criteria to provide a E-W or W-E gesture, against NSEW criteria to provide a N-S or S-N or E-W or W-E gesture, against 8 direction criteria to provide a N-S or S-N or E-W or W-E or NE-SW or SE-NW or NW-SE or SW-NE gesture, against NSEW criteria to provide a TapN or a TapS or a TapE or a TapW gesture, and/or against NSEW criteria to provide a ButtonN or a ButtonS or a ButtonE or a ButtonW gesture.

The entry and exit vectors ENV, EXV are processed to determine a variety of gestures. The entry and exit vectors ENV, EXV are processed to determine if they are in opposite direction. The opposite vectors are processed to determine the crossing direction. The crossing direction is quantized and translated into a specific gesture. The specific gesture may be N-S or S-N. The specific gesture may be E-W or W-E. The specific gesture may be NE-SW or SW-NE. The specific gesture may be NW-SE or SE-NW. There may be also other levels of quantizing forming specific gesture.

The entry and exit vectors ENV, EXV are processed to determine if they are in the same direction. The direction is quantized and translated into a specific tap gesture. The specific gesture may be a tap N, a tap S, a tap E, a tap W and/or a tap N. The specific gesture may be another level of quantizing forming a specific gesture.

The entry vector ENV is coupled with a time exceeding a specific limit. The entry vector ENV is processed to determine an entry direction. The entry direction is quantized forming a specific gesture. The specific gesture is an N button push, an S button push, an E button push, and/or a W button push. The specific gesture may be another level of quantizing forming a specific gesture.

A length of the gesture may be less than a fixed limit such as a first predetermined duration. The gesture event GE is a tap event.

A length of the gesture may exceed a fixed limit such as a second predetermined duration. After that limit a button event is declared as the gesture event GE. The length is continually monitored to determine continuing events. After that limit a button pushed event is declared. After an incremental period of time a button held event is declared. After the gesture ends, a button released event is declared. In the gesture message processing 22 the data is collected and processed in the optical sensor arrangement 10 as shown in the plots and graphical pictures of FIGS. 6D to 6K.

Figure 6D:
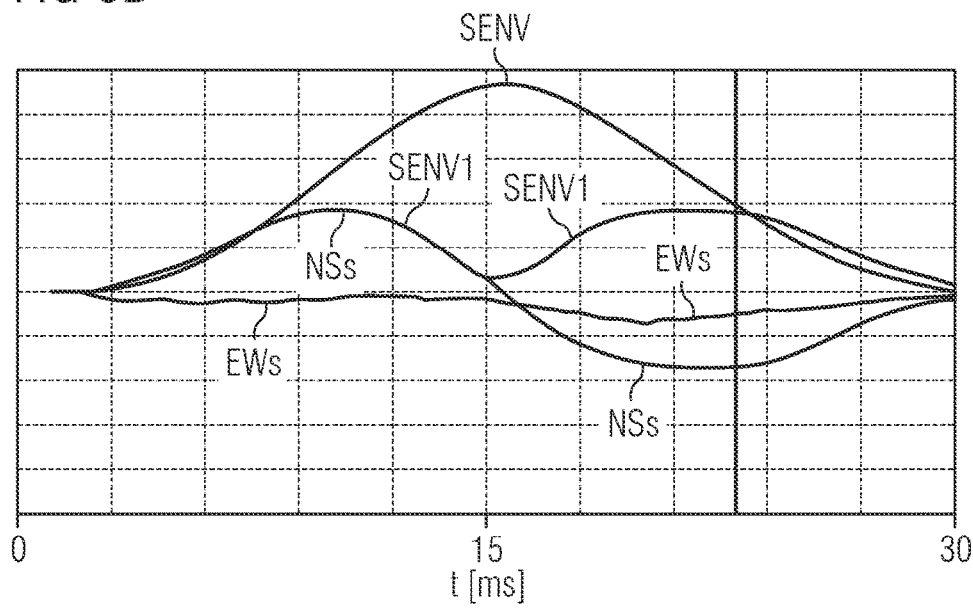
Figure 6E:
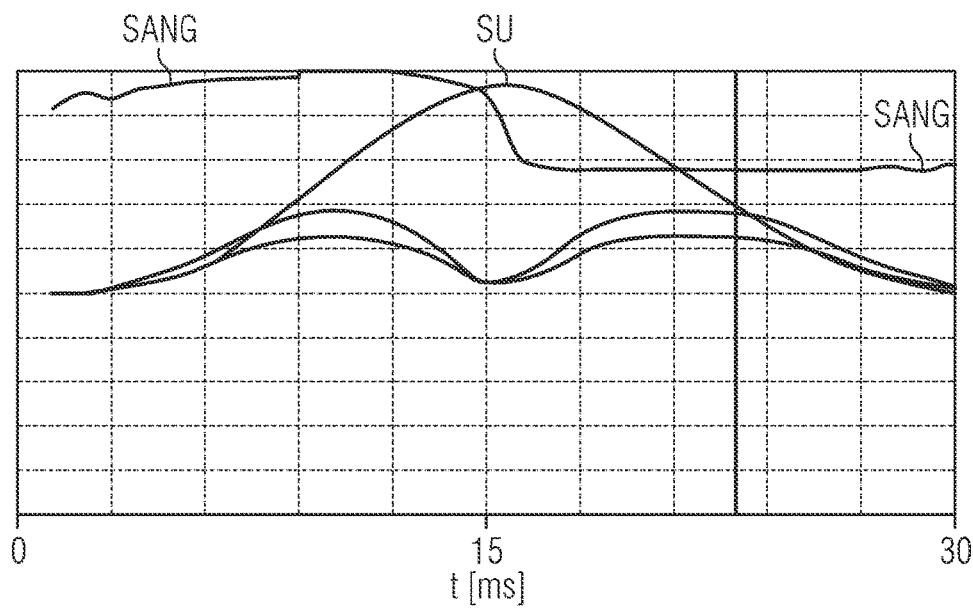

FIGS. 6D and 6E show exemplary embodiments of signal characteristics depending on the time t. In FIG. 6D, a signal SENV indicates an envelope of the NSEW signals. The signal SENV represents the envelope of the first to the fourth sensor signal S1-S4. A signal NSs indicates the N-S strength and a signal EWs indicates the E-W strength. A signal SENV1 shows the envelope of an absolute value of the S-N strength and of the absolute of the E-W strength. A push button is calibrated. The following steps are performed: A search from the left for an entry peak of the SENV signal. A search from the right for an exit peak of the envelope signal SENV. A search from the left to the peak for an entry differential peak. A search from the right to the peak for an exit differential peak. Then data are taken at different peaks and an entry vector ENV and an exit vector EXV are calculated.

In FIG. 6E, an angle signal SANG of the N-S strength and the E-W strength is depicted with a consistent entry and exit angle. The next step is to determine the input and output sampling points. Many different gestures are taken into account: short gestures, long gestures, long distance gestures, gestures with a flat hand, gestures with the side of a hand, gestures with the flat hand and with fingers apart etc. The optimal correct points are chosen by searching from the beginning to the maximum value to determine the peak differential magnitude and using this point as the sample point. This provides the maximum signal to noise ratio. For the case where the gesture has a few number of points, the optical sensor arrangement 10 selects a fixed point position to determine the entry and exit point. For example, if 5 points are sampled, the center could be point 3, then point 2 could be taken as the entry point and point 4 as the exit point.

An alternative method is to take some percentage of the maximum value and search the envelope of total gesture power for that point starting from the beginning and from the ending. For example, if there were 21 points in the gesture and the maximum value was 200, a threshold of ½ of the maximum could be used for the entry and exit point. Searching and selecting a point around that threshold can be used.

An alternative method for a gesture with a larger number of points would be to average the points before extracting the entry and exit vectors ENV, EXV. This is especially useful for low amplitude, for example at a long distance gesture. Another method would be a mixture of the above two methods where the optical sensor arrangement 10 searches for the half of the mid-point of the average of a couple of points using a weighted filter. This method minimized the amount is signal processing needed. An overall algorithm could use a combination of the above.

Exemplary data from the gesture message processing 22 is shown below:

Gesture
　　Entry 35.09@73 deg
　　Exit 36@303 deg
　　Duration 58
　　Repetition −2147483648
　　nDiff Strength 0.98
　　nN–S Strength 0.19
　　nE–W Strength 0.97
　　nNE–SW Strength 0.55
　　nNW–SE Strength 0.79
　　dDiff Strength 77.25
　　dN–S Strength −72.00
　　dE–W Strength −28.00
　　dNE–SW Strength −42.00
　　dNW–SE Strength −30.00
　　Prox4 529.00
　　* d—Differential
　　** n—Normalized The gesture message GM provides all of the information needed to determine the gesture type.

Figure 6F:
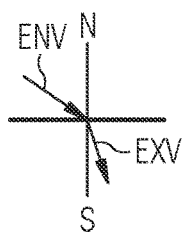
Figure 6G:
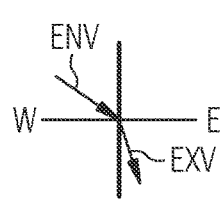
Figure 6H:
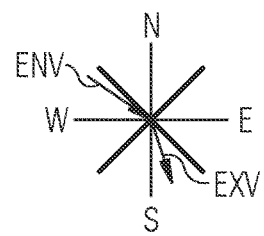

FIGS. 6F, 6G and 6H show an exemplary embodiment of the interpretation of one movement. Whereas FIG. 6F illustrates a north to south system, FIG. 6G illustrates a west to east system. The same movement of the object 34 occurs in FIGS. 6F, 6G and 6H. For the north to south system of FIG. 6F the movement is interpreted as an N–S gesture. In the west-east system of FIG. 6G the same movement is determined as a W–E gesture. FIG. 6H shows a north-east-west-south system.

The decision process for the NS vectors is to determine if the entry vector ENV is between −90 and +90 degree, then the entry was from the north. If the exit vector EXV is between 90 and 270 degree, then the exit is to the south and it is classified as an N–S vector. FIGS. 6F and 6G show an illustration of the NS and EW processing. For the given gesture, it would be interpreted as an N–S gesture in the NS mode and a W–E gesture in the EW mode. In the four direction NSEW mode of FIG. 6H, the decision point must change to 45 degree angles. The previous gesture would be interpreted with the following plot: From the plot, it is not a clear N–S or W–E gesture. The gesture enters from the W and exits to the S. In order to make a decision, more information is needed. In this case, the magnitude of the N–S and E–W are compared and the largest magnitude is selected as the dominate gesture and that result selected. For example, if the entry W–E vector is larger than the exit N–S vector, the gesture is determined to be a W–E gesture.

Figure 6I:
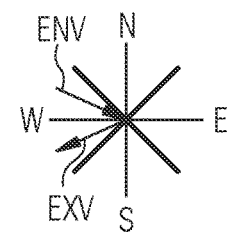

FIG. 6I shows an exemplary embodiment of a west tap gesture. For all direction modes, taps can also be enabled provided the entry and exit vectors ENV, EXV are the same. Push buttons are also provided in each mode where there is an entry vector ENV and there is a long gesture. For the tap gesture, the entry vector ENV and the exit vector EXV must be in the same direction. The following is an example of a West tap gesture.

FIG. 6J shows an exemplary embodiment of a table of gesture events GE. In FIG. 6J, an example of gesture events GE showing the five possible event types is given. A cross_N_S gesture is realized by a movement of the object 34 from the north to the south. A cross_NE_SW gesture is implemented by a movement of the object 34 from the northeast to the southwest. A tap N gesture is realized by a short gesture, when the object 34 is moved to the north of the optical sensor arrangement 10. A button_N gesture is determined, when the object 34 moves to the north of the optical sensor arrangement 10 and a long gesture occurs. Other gestures are a start gesture, a button_held gesture and a button_release gesture.

Alternative sets of possible gestures events GE could comprise:
2 Directions: N–S, S–N
2 Directions: E–W, W–E
4 Directions: N–S, S–N, E–W, W–E
8 Directions: N–S, S–N, E–W, W–E, NE–SW, SW–NE, NW–SE, SE–NW
EE Event: Entry and Exit Vector data available FIG. 6K illustrates exemplary embodiments of gestures from the left to the right such as a north to south gesture, a north button gesture, a north tap gesture and a button held gesture.

The invention claimed is:

1. An optical sensor arrangement, comprising:
　at least two light sensors for providing at least two sensor signals; and
　an evaluation circuit that comprises an input coupled to the at least two light sensors and is designed to generate at least two filtered signals by filtering the at least two sensor signals, to generate at least two offset-compensated sensor signals by subtracting the filtered signals from the corresponding sensor signals and to generate an entry vector indicating the position of an object relative to the at least two light sensors at the start of a gesture and an exit vector indicating the position of the object relative to the at least two light sensors at the end of the gesture,
　wherein a first coordinate of a vector is a north to south strength and a second coordinate of the vector is an east to west strength, and
　wherein the first and the second coordinates of the vector depend on the at least two offset-compensated sensor signals.

2. The optical sensor arrangement according to claim 1, wherein the evaluation circuit is designed to recognize a tap gesture, in response to a determination that the entry vector and the exit vector are nearly the same and the duration of the gesture is less than a first predetermined duration.

3. The optical sensor arrangement according to claim 1, wherein the evaluation circuit is designed to recognize a button gesture, in response to a determination that the entry vector and the exit vector are nearly the same and the duration of the gesture is larger than a second predetermined duration.

4. The optical sensor arrangement according to claim 1, wherein the evaluation circuit is designed to start capturing the at least two sensor signals for gesture detection, in response to a determination that a signal derived from the at least two sensor signals is larger than a gesture entry threshold.

5. The optical sensor arrangement according to claim 4, wherein the evaluation circuit is designed to dynamically adapt the gesture entry threshold depending on the previous values of the at least two sensor signals.

6. The optical sensor arrangement according to claim 4, wherein the evaluation circuit is designed to determine the gesture entry threshold by adding a distance signal to a baseline signal.

7. An optical sensor arrangement, comprising:
　at least two light sensors for providing at least two sensor signals; and
　an evaluation circuit that comprises an input coupled to the at least two light sensors and is designed to evaluate the at least two sensor signals for gesture detection in an adaptive manner using previous values of the at least two sensor signals, wherein the evaluation circuit is designed to start capturing the at least two sensor signals for gesture detection, in response to a determination that a signal derived from the at least two sensor signals is larger than a gesture entry threshold, dynamically adapt the gesture entry threshold depending on the previous values of the at least two sensor signals, such that the evaluation circuit is designed to determine the gesture entry threshold by adding a distance signal to a baseline signal, generate at least two filtered signals by filtering the at least two sensor signals, and generate at least two offset-compensated sensor signals by subtracting the filtered signals from the corresponding sensor signals.

8. The optical sensor arrangement according to claim 7, wherein the evaluation circuit is designed to determine a noise signal by noise filtering of a sum of the at least two sensor signals, and the distance signal by multiplying a standard deviation factor with the noise signal.

9. The optical sensor arrangement according to claim 7, wherein the evaluation circuit is designed to generate at least two scaled sensor signals by multiplying the at least two offset-compensated sensor signals with at least two scale factors, or by adding the at least two offset-compensated sensor signals and at least two scaling coefficients.

10. An optical sensor arrangement, comprising:

at least two light sensors for providing at least two sensor signals, and an evaluation circuit that comprises an input coupled to the at least two light sensors and is designed to evaluate the at least two sensor signals for gesture detection in an adaptive manner using previous values of the at least two sensor signals, wherein the evaluation circuit is designed to start capturing the at least two sensor signals for gesture detection, in response to a determination that a signal derived from the at least two sensor signals is larger than a gesture entry threshold, dynamically adapt the gesture entry threshold depending on the previous values of the at least two sensor signals, such that the evaluation circuit is designed to determine the gesture entry threshold by adding a distance signal to a baseline signal, determine a slow filter signal by filtering a sum of the at least two sensor signals with a slow filter, determine a medium filter signal by filtering the sum of the at least two sensor signals with a medium filter, and determine the baseline signal by selecting the minimum of the slow filter signal and the medium filter signal, the slow and the medium filter being realized by low pass filtering and a cutoff frequency of the slow filter is lower than a cutoff frequency of the medium filter.

11. A method for gesture detection, comprising:

providing at least two sensor signals by at least two light sensors;

generating at least two filtered signals by filtering the at least two sensor signals;

generating at least two offset-compensated sensor signals by subtracting the filtered signals from the corresponding sensor signals; and generating an entry vector indicating the position of an object relative to the at least two light sensors at the start of a gesture and an exit vector indicating the position of the object relative to the at least two light sensors at the end of the gesture, wherein a first coordinate of a vector is a north to south strength and a second coordinate of the vector is an east to west strength, and wherein the first and the second coordinates of the vector depend on the at least two offset-compensated sensor signals.

12. A method for gesture detection, comprising:

providing at least two sensor signals by at least two light sensors;

evaluating the at least two sensor signals for gesture detection in an adaptive manner using previous values of the at least two sensor signals, wherein capturing the at least two sensor signals for gesture detection starts, in response to a determination that a signal derived from the at least two sensor signals is larger than a gesture entry threshold, and the gesture entry threshold is dynamically adapted depending on the previous values of the at least two sensor signals such that the gesture entry threshold is determined by adding a distance signal to a baseline signal;

generating at least two filtered signals by filtering the at least two sensor signals; and generating at least two offset-compensated sensor signals by subtracting the filtered signals from the corresponding sensor signals.

13. A method for gesture detection, comprising:

providing at least two sensor signals by at least two light sensors;

evaluating the at least two sensor signals for gesture detection in an adaptive manner using previous values of the at least two sensor signals, wherein capturing the at least two sensor signals for gesture detection starts, in response to a determination that a signal derived from the at least two sensor signals is larger than a gesture entry threshold, and the gesture entry threshold is dynamically adapted depending on the previous values of the at least two sensor signals such that the gesture entry threshold is determined by adding a distance signal to a baseline signal;

determining a slow filter signal by filtering a sum of the at least two sensor signals with a slow filter;

determining a medium filter signal by filtering the sum of the at least two sensor signals with a medium filter; and determining the baseline signal by selecting the minimum of the slow filter signal and the medium filter signal, wherein the slow and the medium filter are realized by low pass filtering and a cutoff frequency of the slow filter is lower than a cutoff frequency of the medium filter.

\* \* \* \* \*